May 17, 1949. J. H. COULTER ET AL 2,470,603
COLLET TYPE ELECTRODE
Filed Dec. 12, 1946 2 Sheets-Sheet 1
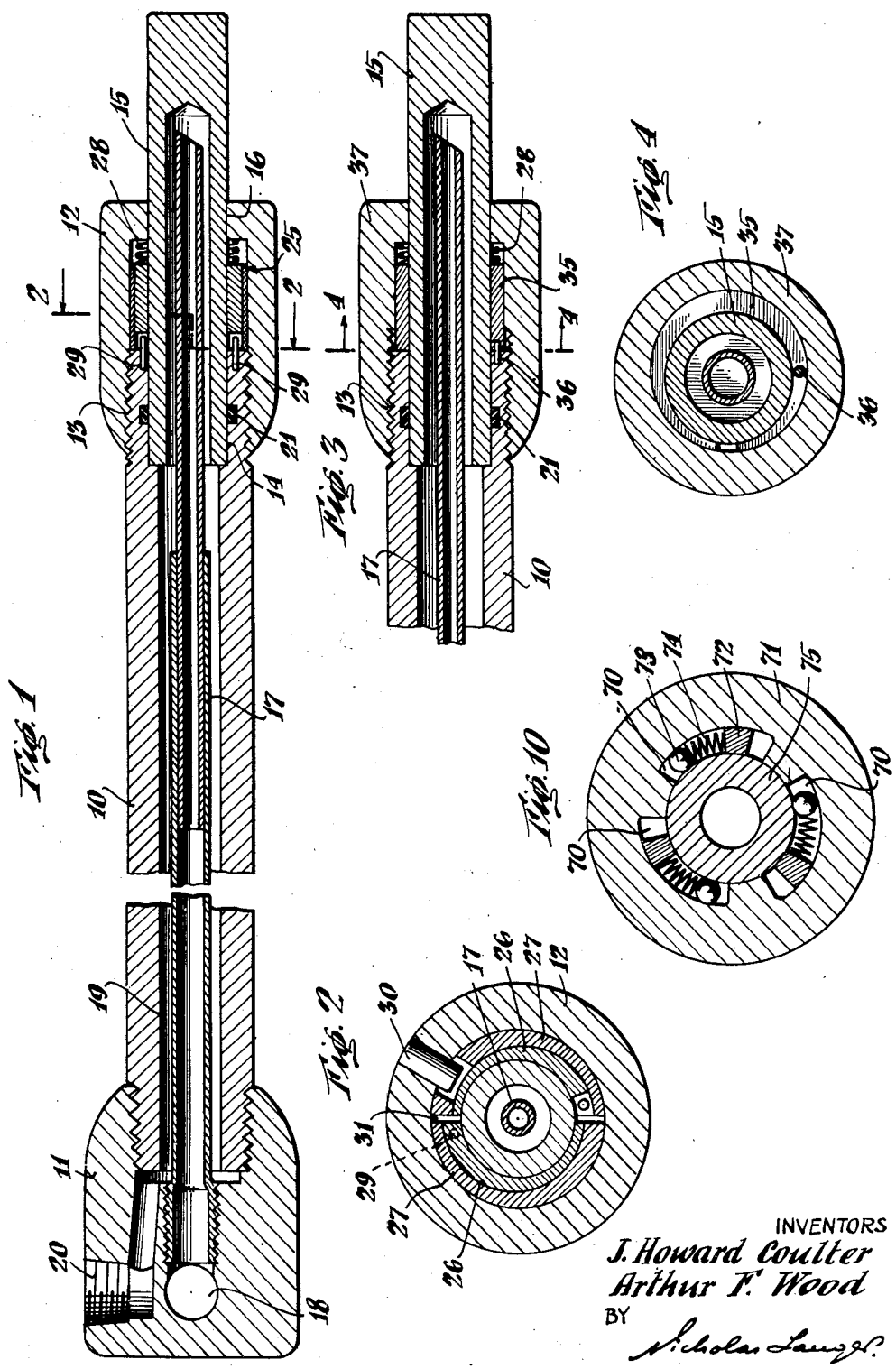
INVENTORS
J. Howard Coulter
Arthur F. Wood
BY
Nicholas Lauzer
ATTORNEY

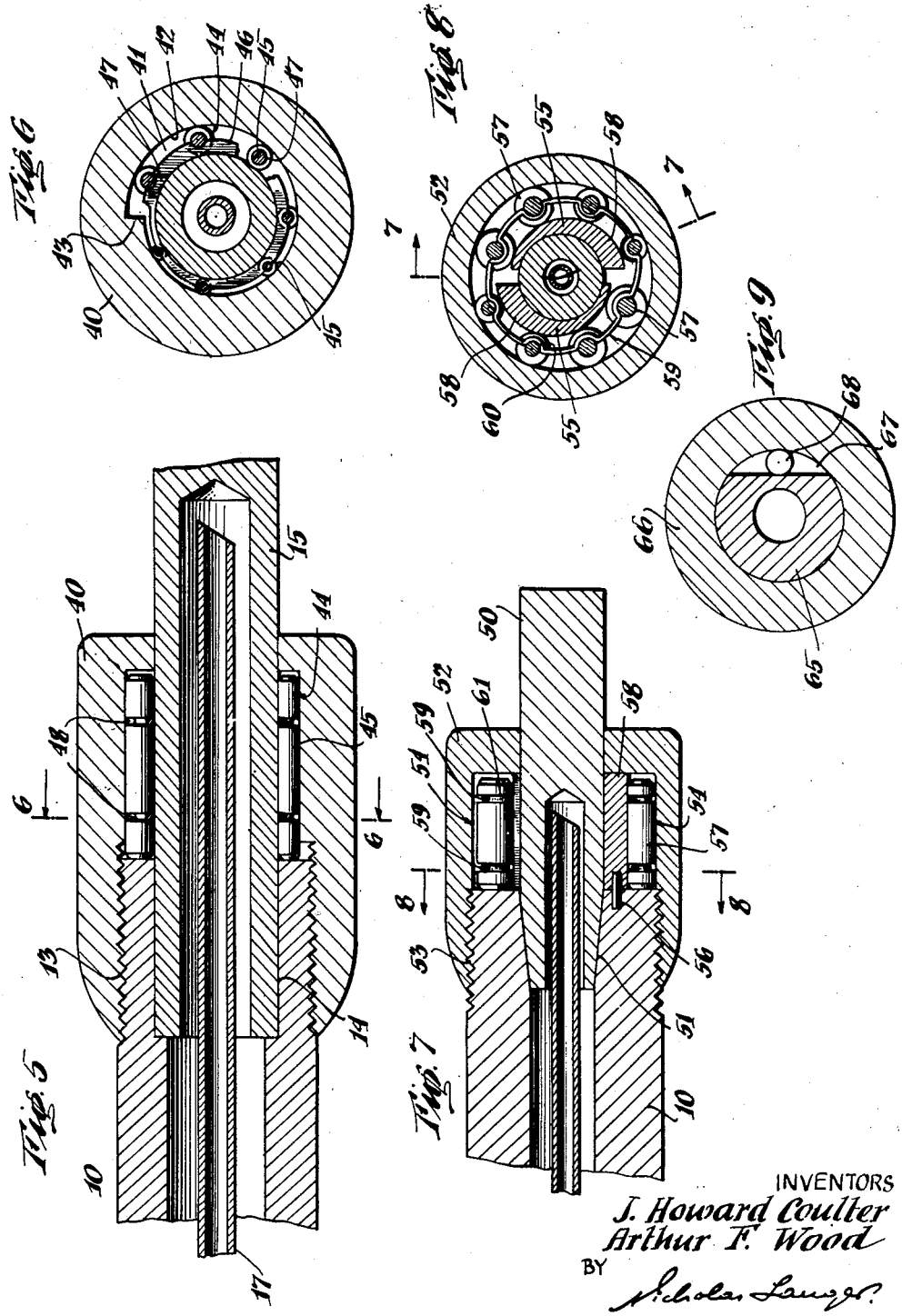

Patented May 17, 1949

2,470,603

UNITED STATES PATENT OFFICE 2,470,603

COLLET TYPE ELECTRODE

John H. Coulter and Arthur F. Wood, Indianapolis, Ind., assignors to P. R. Mallory & Co., Inc., Indianapolis, Ind., a corporation of Delaware Application December 12, 1946, Serial No. 715,890

13 Claims. (Cl. 219—4)

1

This invention relates to welding electrodes and, more particularly, to a new and improved means for releasably clamping a welding tip to an electrode holder.

Heretofore, it has been common practice to mount a welding tip upon an electrode holder by the use of a tapered socket formed in the electrode holder, the outer portion of the welding tip being complementary to such tapered socket and being held in the socket by a force fit. Although this method of assembling the welding tip and welding electrode provides excellent electrical contact between the tip and the body of the holder, several disadvantages are connected with the use of such structure. In the first place, the force fit between the welding tip and the socket makes it extremely difficult to remove the tip for replacement or repair of the welding surface. Many proposals have been made to overcome this problem, among them the use of an inner sleeve engaging the welding tip and extending through and beyond the holder so that it may be struck with a mallet or other tool to thereby remove the tip. Although, in many instances highly successful results have attained by the use of such devices, several additional parts are required resulting in increased cost and complexity of assembly and adjustment.

It is an object of this invention to overcome the difficulties experienced with prior art structure by providing a novel clamping means to secure the welding tip in position on the electrode holder without the use of a tapered socket.

It is a further object of the invention to provide a clamping device for quickly and easily removing a welding tip from an electrode holder where a tapered socket is utilized without the use of an ejector sleeve for disassembling the tip.

It is a still further object of the invention to provide a clamping device which insures a large area of contact between the welding tip and the body of the electrode holder, thus providing a low resistance path for the conduction of current between these parts.

The invention further aims to provide an efficient seal between the body of the electrode holder and the welding tip thus preventing the escape of cooling fluid from the welding electrode.

It is a further object of the invention to provide a low cost welding electrode of simple and durable construction which is adapted to withstand severe usage.

Other objects of the invention will be apparent from the following description and accompanying drawings taken in connection with the appended claims.

The invention accordingly comprises the features of construction, combination of elements, arrangements of parts, and methods of manufacture referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 1 is a vertical, sectional view showing a welding electrode utilizing the novel clamping device of the present invention;

Figure 2 is a sectional view taken along the line 2—2 of Figure 1;

Figure 3 is a vertical, sectional view showing a modified form of clamping device;

Figure 4 is a sectional view taken along the line 4—4 of Figure 3;

Figure 5 is a vertical, sectional view disclosing the use of a set of rollers to clamp the welding tip in position upon the welding electrode;

Figure 6 is a sectional view taken along the line 6—6 of Figure 5;

Figure 7 is a vertical, sectional view showing a modification of the structure disclosed by Figure 5;

Figure 8 is a sectional view taken along the line 8—8 of Figure 7; and

Figures 9 and 10 are sectional views illustrating additional modifications of the invention.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Broadly speaking, the present invention contemplates the provision of a cap rotatably or movably mounted on the electrode holder, such cap being apertured to receive the inner end of a welding tip which is preferably inserted into a socket on the electrode holder. In accordance with the invention, slidable clamping means are disposed between the welding tip and the inner surface of the cap, such clamping means sliding and becoming wedged between the tip and the cap in response to rotation or movement of the cap. On one hand, where a non-tapered socket is utilized, the tip is held in clamped position upon rotation of the cap in one direction, and then released from such clamped position when the cap is rotated or moved in the opposite direction thus permitting the tip to be removed from its socket by a simple sliding action. On the other hand, where a tapered socket is utilized, the tip is maintained in position within the socket by a force fit and, when it is desired to remove the tip, the collet cap is rotated in the proper direction to cause the clamping means to engage the tip and force it longitudinally away from the socket.

In the embodiment of the invention illustrated by Figures 1 and 2, a barrel or electrode holder 10 is screw-threaded to a water supply head 11 and the electrode holder carries a collet cap 12 which may be movably or rotatably mounted thereon. In the example shown, the collet cap is screw-threaded to the electrode holder at 13. A cylindrical or non-tapered socket portion 14 is provided at the end of the electrode holder and this socket is adapted to receive a welding tip 15 which extends through an opening or aperture 16 in the collet cap.

A system is provided for circulating water or other cooling fluid through the body of the electrode holder and the tip, this system comprising a two-section telescoped tube 17 which is connected to a fluid inlet passage 18 in the water supply head. In this manner, cooling fluid may be circulated through the conduit 17 into contact with the head of the welding tip, back through the interspace 19 between the conduit and the inner surface of the electrode holder and thence out through a cooling fluid outlet 20. A gasket 21 is provided in the socket portion of the electrode holder for preventing escape of cooling fluid through the joint between the welding tip and the socket.

In accordance with the invention, eccentric clamping means 25 are slidably mounted between the collet cap 12 and the tip 15. In the example shown, this clamping means comprises an inner set of eccentric sleeve members 26, 26 and an outer set of eccentric sleeve members 27, 27 complementary to and in contact with the inner set. Referring to Figure 2, it will be observed that there is a substantial area of contact between the sleeve members 27 and the cap as well as between the inner sleeve members 26 and the welding tip. It will be apparent, therefore, that a low resistance path is provided for the passage of electrical current through the electrode holder 10, cap 12, eccentric sleeve members 26, 27 and welding tip 15. A good electrical connection between the tip and electrode holder is further insured by a compression spring 28 which urges the eccentric sleeve members into engagement with the body of the electrode holder.

The sleeve members 26 are secured to the electrode holder by pins 29, respectively, and one of the outer sleeve members 27 is secured to the collet cap by a pin 30. If desired, the other sleeve member 27 may also be secured to the cap 12 but this is not essential as the outer sleeve members move substantially as a unit since the gap 31 between the two sets of eccentrics is very small.

When a welding tip 15 is inserted into the socket 14 and the collet cap is moved or rotated in a clockwise direction, Figure 2, the outer eccentric sleeve members slide to a limited extent, along the inner sleeve members 26 forcing the latter parts into clamping engagement with the welding tip. In this manner, the tip is firmly secured in position within the socket. When the tip is clamped in this manner, the gasket 21 prevents the escape of cooling fluid from the interior of the welding electrode. When the cap 12 is moved or rotated in the opposite direction, that is, in a counterclockwise direction, Figure 2, the outer eccentric members 27 return to their original position and the inner eccentric members are released from clamping engagement with the welding tip. Thereupon, the tip may be removed from the socket by a simple sliding action.

In the remaining figures, the construction of the electrode holder 10, water supply head 11 and cooling system may be similar to those already described. Accordingly, further detailed description of these parts is omitted and they are indicated hereafter by like reference characters.

In Figures 3 and 4, the clamping means slidably interposed between the collet cap 12 and the welding tip comprises an eccentric split ring 35, one portion of which is secured to the body of the electrode holder as, for example, by a pin 36. A collet cap 37 is movably or rotatably supported on the electrode holder 10 and the interior surface of this cap is complementary to the outer surface of eccentric split ring 35. When the collet cap is rotated in a counterclockwise direction, Figure 4, the split ring is compressed and slides for a limited distance along the outer surface of the welding tip thereby clamping it firmly in position within the socket. It will be apparent that the split ring is released from such clamping engagement when the collet cap is rotated in a clockwise direction, Figure 4.

Referring to the modification of Figures 5 and 6, a collet cap 40 is rotatably mounted on the body 10 of the electrode holder and this cap has an interior passage or cavity 41 of eccentric cross-section defined by an arcuately curved portion 42 and a shoulder 43. Clamping means, generally indicated at 44, are mounted between the inner surface 42 and the welding tip, such clamping means comprising a series of rollers 45 which are of progressively decreasing diameter proceeding in a clockwise direction, Figure 6, from the shoulder 43. These rollers are forced into engagement with the inner surface 42 and maintained in spaced angular position by resilient retaining rings 46 each of which has a plurality of loops or bends 47 formed therein which spring fit into grooves 48 associated therewith in the rollers. In the example shown, two retaining rings are utilized and, accordingly, two grooves 48 are provided in each roller. When the collet cap is rotated in a clockwise direction, Figure 6, the rollers slide to a limited extent along the outer surface of the welding tip and are forced into clamping engagement with the welding tip. When the cap 40 is rotated in a counterclockwise direction, Figure 6, the rollers are released from clamping engagement with the welding tip which may then be readily removed from the socket 14. It will be observed that, when the tip is removed, the rollers are held within the collet cap by the retaining rings 46.

Referring now to Figures 7 and 8, a modified construction is shown in which a welding tip 50 is seated in a tapered socket 51 in the electrode holder. In this case, the tip is maintained in seated position by a force fit between the shank thereof and the tapered portion of the socket. A collet cap 52 is screw threaded at 53 with a left-hand thread to the body of the electrode holder and clamping means, generally indicated at 54, are suitably mounted between the cap and the tip. In this instance, the clamping means comprises a pair of inner eccentric members 55, 55 which are pinned or otherwise suitably secured to the electrode holder as at 56. A set of rollers 57 is associated with each of the inner sleeve members 55, each set of rollers being of progressively increasing diameter proceeding in a counterclockwise direction from the end portions 58 of the respective eccentric sleeves. The rollers are maintained in substantially fixed angular position between the sleeve members and inner surface of the collet cap by retaining rings 59 having looped portions 60 which fit into grooves 61 upon the respective rollers. When it is desired to remove the tip 50 from the tapered socket 51, the cap 52 is rotated in clockwise direction, Figure 8, thus forcing the eccentric sleeve members 55 into clamping engagement with the welding tip. Further rotation of the cap 52 in the same direction causes the collet cap to move longitudinally away from the electrode holder on threads 53 and, since the tip is clamped to the collet cap, it is forcibly removed from the tapered socket 51. Thereupon, the collet cap is rotated in the opposite direction releasing the members 55 from clamping engagement with the tip and permitting the tip to be removed from the collet cap. It is to be understood that the clamping means described in connection with Figures 7 and 8 may be used in conjunction with non-tapered sockets as shown in the remaining figures and that the clamping devices of said remaining figures may be utilized for removing a welding tip from a tapered socket in the manner explained in connection with Figures 7 and 8.

In the modification of Figure 9, a welding tip 65 together with a collet cap 66 is shaped to form a cavity 67 in which is mounted a pin 68. When the collet cap is rotated in either direction, the pin slides, to a limited extent, with the collet cap and becomes wedged between said collet cap and the tip. When the cap is rotated in the opposite direction the pin is released from clamping engagement and the welding tip may then be withdrawn from the socket.

In the modification illustrated by Figure 10, a plurality of cavities 70 are provided in a collet cap 71, a stop member 72 being mounted in each cavity and secured in any suitable manner to the cap. The cavities are all of progressively decreasing depth proceeding, in a counterclockwise direction, from the associated stop 72 and a pin 73 is mounted in the shallow portion of each cavity. A compression spring 74 is disposed between each stop and its associated pin to urge the pin toward the shallow portion of the cavity. The pins may be retained within the cavity by any suitable means such as retaining rings or by a suitable collet. A welding tip 75 is mounted within the cavity and, when the cap is rotated in a counterclockwise direction, Figure 10, the pins are forced into clamping engagement with the welding tip. When the cap is rotated in clockwise direction, Figure 10, the pins are released from such clamping engagement thus permitting the welding tip to be removed from its socket.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. In a welding electrode, the combination which comprises an electrode holder, a cap rotatably mounted on said holder, seating means in said holder for receiving a welding tip with a portion thereof extending inside said cap, said portion of the tip defining an interspace with the inner surface of the cap, at least one clamping member in said interspace having inner and outer circumferential surfaces of increasing radial distance from each other, and means for connecting one of the two elements including said cap and said holder to said clamping member whereby upon rotational relative displacement of said two elements said clamping member will be slidably and rotationally displaced in said interspace with respect to the element to which it is not connected and will become wedged between the welding tip and the cap.

2. In a welding electrode, the combination which comprises an electrode holder of conductive material, a cap rotatably mounted on and electrically connected to said holder, a socket in said holder for receiving a welding tip with a portion thereof extending inside said cap, said portion of the tip defining a generally annular interspace with the inner surface of the cap, at least one clamping member in said interspace having inner and outer circumferential surfaces of increasing radial distance from each other, and means for connecting one of the two elements including said cap and said holder to said clamping member whereby upon rotational relative displacement of said two elements said clamping member will be slideably and rotationally displaced in said interspace with respect to to the element to which it is not connected and will become wedged between the welding tip and the cap with a substantial area thereof in pressure contact with the welding tip and the cap to provide a low resistance electrical connection therebetween.

3. In a welding electrode, the combination which comprises an electrode holder having a socket at one end thereof for receiving a welding tip, a cap rotatably mounted on and electrically connected to said holder, the terminal regions of the tip defining a generally annular interspace with the inner surface of the cap, at least one clamping member in said interspace having inner and outer circumferential surfaces of increasing radial distance from each other and of such shape as to be adapted to contact a substantial area of said welding tip and said cap respectively, means for connecting one of the two elements including said cap and said holder to said clamping member whereby upon rotational relative displacement of said two elements said clamping member will be slideably and rotationally displaced in said interspace with respect to the element to which it is not connected and will be wedged in said contact area between the welding tip and the cap, and means for retaining said clamping member in position within the cap when the welding tip is removed from said socket of the holder.

4. In a welding electrode, the combination which comprises an electrode holder having a socket at one end thereof for receiving a welding tip, a collet cap rotatably mounted on said end of the holder, the terminal regions of the tip defining a recess with the inner surface of the cap, at least one clamping member in said recess having uniform cross section in the axial direction and having inner and outer surfaces separated by tapering thickness in the radial direction, and means for connecting said member to said cap for joint rotational displacement around said holder whereby upon rotation of the cap in one direction the said surfaces of the clamping member will be forced into pressure engagement with corresponding surfaces of the tip and the cap to clamp the tip in said socket and upon rotation of the cap in the opposite direction the said surfaces of the clamping member will be disengaged from the corresponding surfaces of the tip and the cap to release the tip from the socket.

5. In a welding electrode, the combination which comprises an elongated tubular electrode holder having a tapered socket for receiving and retaining a welding tip, a collet cap screw-threaded to the end of said electrode holder and internally defining a generally annular recess with the shank of said tip in said socket, clamping means in said recess including at least one eccentric clamping member having converging inner and outer pressure faces engageable with co-operating surfaces of the tip and of the cap, and means responsive to relative rotational displacement of said holder and said cap to rotationally wedge said clamping member between said tip and said cap, said cap, when unscrewed from the electrode holder, causing the eccentric clamping member to grip the welding tip and force it longitudinally away from said electrode holder, said cap, when rotated in the opposite direction, releasing the said eccentric clamping member from clamping engagement with said welding tip.

6. In a welding electrode, an elongated tubular electrode holder, and means for removably clamping an electrode tip in said holder, said clamping means comprising a collect cap screw-threaded to the end of said electrode holder through which the shank of said tip may extend into said holder defining with the inner surface of the cap a generally annular recess, an eccentric clamping member having converging inner and outer pressure faces engageable with co-operating surfaces of the tip and of the cap, and means responsive to rotation of said cap to rotationally displace said clamping member in said recess, said cap, when rotated in one direction, forcing the eccentric clamping member into wedged clamping engagement with the electrode tip mounted in said holder, said cap, when rotated in the other direction, releasing the said member from clamping engagement with said electrode tip.

7. In a welding electrode, an electrode holder having a socket therein for receiving a welding tip, a collet cap rotatably mounted on said electrode holder, inner eccentric means fixed to said holder and adapted to engage the outer surface of a welding tip, and outer eccentric means, complementary with said inner eccentric means whereby, rotation of the collet cap in one direction causing the outer eccentric means to move with said collet cap and force the inner eccentric means into clamping engagement with the surface of the welding tip, said inner eccentric means being released from clamping engagement with the welding tip when the collet cap is turned in the other direction.

8. In a welding electrode, an electrode holder having a socket therein for receiving a welding tip, a collet cap rotatably mounted on said electrode holder, an inner set of eccentric sleeve members secured to said electrode holder and adapted to contact a substantial area of a welding tip mounted in said socket, and an outer set of eccentric sleeve members complementary to said inner set and adapted to engage a substantial area of said collet cap, one of said outer eccentric sleeves being fixed to said collet cap whereby, when the collet cap is turned in one direction, the outer eccentric sleeve moves with said cap and forces the inner eccentric sleeve into clamping engagement with the welding tip, said inner sleeve being released from said clamping engagement when the collet cap is turned in the other direction.

9. In a welding electrode, an electrode holder having a socket therein for receiving a welding tip, a collet cap rotatably mounted on said electrode holder, an inner set of eccentric sleeve members secured to said electrode holder and adapted to contact a substantial area of a welding tip mounted in said socket, an outer set of eccentric sleeve members complementary to said inner set and adapted to engage a substantial area of said collet cap, one of said outer eccentric sleeves being fixed to said collet cap whereby, when the collet cap is turned in one direction, the outer eccentric sleeves move with said cap and force the inner eccentric sleeves into clamping engagement with the welding tip, said inner sleeves being released from said clamping engagement when the collet cap is turned in the other direction, and means comprising a compression spring for forcing the inner sleeve members into engagement with the body of the electrode holder to secure a good electrical connection between the welding tip and the body of the electrode holder.

10. In a welding electrode, an electrode holder, a collet cap having an inner portion with an eccentric shaped inner surface and being rotatably mounted on said electrode holder, socket means for receiving a welding tip with a portion thereof extending inside said collet cap, an eccentric split ring slidably mounted between the welding tip and the collet cap, and means for securing a portion of said eccentric split ring to the body of the electrode holder whereby rotation of the collet cap in one direction compresses the split ring and forces it into clamping engagement with the welding tip, rotation of the collet cap in the other direction releasing the eccentric split ring from clamping engagement with the welding tip.

11. In a welding electrode, an electrode holder having a socket therein for receiving a welding tip, a collet cap having an inner portion with an eccentric shaped surface and being rotatably mounted on said electrode holder, an eccentric split ring disposed between said collet cap and a welding tip mounted within said socket, said eccentric ring being pinned to the body of said electrode holder, and engaging a large portion of said surface of the collet cap and the welding tip to afford a good electrical connection therebetween, rotation of the collet cap in one direction forcing said eccentric ring into clamping engagement with the welding tip, rotation of the collet cap in opposite direction releasing the eccentric ring from clamping engagement with the welding tip.

12. In a welding electrode, an electrode holder having a socket therein for receiving a welding tip, a collet cap rotatably mounted on said electrode holder, a series of rollers of progressively increasing diameter disposed circumferentially about the inner surface of the collet cap, said rollers being adapted to engage a welding tip inserted into said socket, and means for retaining said rollers in substantially fixed angular relation about the inner surface of said collet cap whereby, when the cap is rotated in one direction, the rollers are forced into engagement with the welding tip to secure it in its position within said socket and when the cap is rotated in the other direction, the rollers are released from clamping engagement with the welding tip.

13. In a welding electrode, an electrode holder having a socket therein for receiving a welding tip, a collet cap rotatably mounted on said electrode holder, a series of rollers of progressively increasing diameter disposed circumferentially about the inner surface of the collet cap, said rollers being adapted to engage a welding tip inserted into said socket, a retaining ring mounted inside said collet cap and having notched portions which are adapted to engage grooves in said rollers and hold them in fixed angular relation with respect to the inner surface of the collet cap whereby, when the cap is rotated in one direction, the rollers are forced into engagement with the welding tip to secure it in its position within said socket and when the cap is rotated in the other direction, the rollers are released from clamping engagement with the welding tip.

JOHN H. COULTER.
ARTHUR F. WOOD.

REFERENCES CITED

The following references are of record in the file of this patent:

UNITED STATES PATENTS

| Number | Name | Date |
| --- | --- | --- |
| 2,277,894 | Welsh | Mar. 31, 1942 |
| 2,399,797 | Gross et al. | May 7, 1946 |